United States Patent
Brunard et al.

(12)

(10) Patent No.: US 7,060,228 B2
(45) Date of Patent: Jun. 13, 2006

(54) INTERNAL DEVICE FOR SEPARATING A MIXTURE THAT COMPRISES AT LEAST ONE GASEOUS PHASE AND ONE LIQUID PHASE

(75) Inventors: Nathalie Brunard, Chaponost (FR); Thierry Gauthier, Brignais (FR); Jean-Paul Lepage, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 596 days.

(21) Appl. No.: 10/189,774

(22) Filed: Jul. 8, 2002

(65) Prior Publication Data

US 2003/0021738 A1    Jan. 30, 2003

Related U.S. Application Data

(60) Provisional application No. 60/361,059, filed on Mar. 1, 2002.

(30) Foreign Application Priority Data

Jul. 6, 2001    (FR) .................................. 01 09055

(51) Int. Cl.
F27B 15/02 (2006.01)
B01J 8/18 (2006.01)

(52) U.S. Cl. ..................... 422/147; 422/140; 208/161; 208/163

(58) Field of Classification Search ............... 422/147, 422/140; 208/143, 210, 251 H, 254 H, 157, 208/161, 163
See application file for complete search history.

(56) References Cited

U.S. PATENT DOCUMENTS

| | | | |
|---|---|---|---|
| RE25,770 E | 4/1965 | Johanson | |
| 4,221,653 A | 9/1980 | Chervenak et al. | |
| 4,810,359 A | 3/1989 | Sayles | |
| 4,886,644 A | 12/1989 | Chan | |
| 4,971,678 A | 11/1990 | Strickland | |
| 5,066,467 A | * 11/1991 | Chan | ................... 422/140 |
| 5,389,238 A | * 2/1995 | Liu et al. | ................... 208/157 |
| 5,624,642 A | 4/1997 | Devanathan et al. | |

FOREIGN PATENT DOCUMENTS

| | | |
|---|---|---|
| EP | 0 428 796 | 5/1991 |
| EP | 0 732 389 A2 | 9/1996 |
| EP | 1 086 734 A1 | 3/2001 |

OTHER PUBLICATIONS

Patent Abstract of Japan—vol. 0091, No. 80 (C-293), Jul. 25, 1985 & JP 60 051510 A (Mitsubishi Jukogyo KK), Mar. 23, 1985.

* cited by examiner

*Primary Examiner*—Walter D. Griffin
(74) *Attorney, Agent, or Firm*—Millen, White, Zelano & Branigan, P.C.

(57) ABSTRACT

Device that is integrated in a chamber that allows a separation of a mixture that comprises at least one gaseous fraction and one liquid fraction, whereby said mixture is obtained from a zone for bringing into contact a liquid phase, a gaseous phase and solid particles.

21 Claims, 4 Drawing Sheets

INTERNAL DEVICE FOR SEPARATING A MIXTURE THAT COMPRISES AT LEAST ONE GASEOUS PHASE AND ONE LIQUID PHASE

CROSS REFERENCE OF RELATED APPLICATION

This application claims the benefit of Provisional Application 60/361,059 filed Mar. 1, 2002.

FIELD OF THE INVENTION

This invention relates to a device that employs a solid phase and liquid and gaseous phases in the same chamber. The invention can be applied generally in the fields of conversion and/or of treatment of distillates or residues that are obtained from the distillation of petroleum. More specifically, said invention makes it possible to improve, within a reaction chamber, the separation of a mixture that comprises a gaseous fraction and a liquid fraction that optionally comprise solid particles, whereby said mixture is obtained from a zone for bringing into contact a liquid phase, a gaseous phase and solid particles.

According to the invention, said solid particles can be dispersed into, for example, said liquid phase within a suspension in a lower zone of the chamber (slurry reactor). According to a preferred method for applying this invention, said solid phase can consist of solid particles within a boiling bed. Examples of reactors that operate according to the principles that are characteristic of suspension beds (slurry) and boiling beds as well as their main applications are described in, for example, "Chemical Reactors," P. Trambouze, H. Van Iandeghem and J. P. Wauquier, ed. Technip (1988).

More particularly but in a non-limiting way, this invention can be applied in, for example, the conversion of a feedstock that is introduced into said chamber in liquid form and that contains hydrocarbons, whereby said conversion is carried out by bringing it into contact with a gaseous phase that comprises, for example, hydrogen (hydroconversion) and with a solid phase that most often offers a catalytic activity.

Said feedstock can be, without exceeding the scope of the invention, an atmospheric residue that is obtained by direct distillation of a crude oil, a distillate that is obtained by vacuum distillation of an atmospheric residue of a crude oil or a hydrocarbon-containing liquid feedstock that is obtained from coal.

The invention can also be applied to, for example, processes for hydrotreatment of hydrocarbon feedstocks such as the processes for hydrodesulfurization, hydrodenitrating, hydrodemetallization or hydrodearomatization of various petroleum fractions.

Although this device can be applied to any process that requires bringing into contact a gaseous phase and a liquid phase with a solid particle bed, the invention will be described later on in a non-limiting manner in the particular case of the hydroconversion of a hydrocarbon feedstock in a boiling bed with solid catalyst particles.

PRIOR ART

The boiling-bed process that is used for hydroconversion of heavy hydrocarbon fractions or a hydrocarbon-containing liquid feedstock that is obtained from a coal generally consists in bringing into contact, in an upward co-current flow, a liquid-phase hydrocarbon-containing feedstock and a gaseous phase in a reactor that contains a solid phase that most often comprises a hydroconversion catalyst. The reaction zone preferably comprises at least one means for drawing off solid particles that are located close to the bottom of the reactor and at least one make-up means of said particles containing a catalyst that is close to the top of said reactor. Said reaction zone most often comprises at least one circuit that allows the recycling of the liquid phase, located inside or outside the reaction zone, whereby the purpose of said recycling, according to a technique that is known to one skilled in the art, is to keep the bed expanded enough to ensure good operation of the reaction zone in a three-phase process (gas/solid/liquid).

U.S. Pat. No. Re25,770 describes, for example, such a process. A mixture of liquid hydrocarbons and hydrogen is injected through a catalyst bed such that the bed is expanded. The catalyst level is controlled with recycling of the liquid, whereby said catalyst level remains below that of the liquid. The gas and the hydrogenated liquid traverse an interface that delimits a zone that contains a large portion of the solid particles of the catalyst bed and are found in a zone that is virtually free of said particles. After a gas/liquid separation of the fluids that are obtained from the reaction, said fluids are then divided into two fractions: a fraction that contains a large portion of the liquid is passed to the recycle pump, and another portion is drawn off from the reactor with the gas. Said gas/liquid separation, however, is not complete, and a substantial amount of gas is entrained with the liquid passed to the recycle pump via the recycling pipe. This entrainment of gas is harmful because it causes pump cavitation as well as impairing the control of the catalyst level that can cause the total loss of the expansion of the bed.

To solve this problem, several processes and/or devices have been proposed:

U.S. Pat. No. 4,221,653 describes a piece of equipment that is inside the reactor and that consists of a cup that is preferably conical in shape and that is equipped with chimneys that are placed in two concentric circles. According to the position of the pipes, the composition of the fluid that traverses it varies. The gas-rich pipes and the liquid-rich pipes are differentiated. The gas-rich pipes are those that are located on the periphery. Their inlet is located on the surface of the cup, and their outlet is placed far enough from the liquid-rich tube outlets and recycling pipe to minimize the gas-liquid interactions. The inlet of the liquid-rich pipes is located below the surface of the cup. After having traversed the recycling cup, a large portion of the liquid is passed to the recycle pump, and the other portion is drawn off from the reactor with the gas. A gas fraction, estimated at less than 8% by volume, is entrained, however, with the recycled liquid.

U.S. Pat. No. 4,886,644 proposes improving the preceding device by the addition of helicoidal inserts that communicate a tangential speed to the fluid. It is also proposed to add cyclones above the pipes to improve the effectiveness of the separation of the gaseous fraction and the liquid fraction.

U.S. Pat. No. 4,810,359 describes a device where the separation of the gaseous and liquid fractions is carried out with a cyclone that is placed at the top of the reactor. The cyclone is connected to the recycling pipe that brings the liquid to a pump. Using this device, a large portion of the gaseous fraction is withdrawn from the recycled liquid, but a substantial portion of the liquid is entrained in the gas of the upper portion of said cyclone.

According to another principle, as described in, for example, Patent Application EP 1,086,734, the fractionation of the mixture that is obtained from the boiling bed is carried out outside of the reactor.

Patent Application EP 732,389 proposes using two reactors in a series by including a gas-liquid separator between said two reactors. A portion of the fluid that is obtained from the first reactor is recycled to said first reactor so as to maintain the boiling bed of the catalyst while the other portion is sent into said gas/liquid separator. The essentially liquid fraction that results from this separation then feeds at least in part a second reactor that is placed in series.

For economic reasons, the separator that is placed after the reactor is much smaller than the reactor, and the liquid level control in the outside separator is consequently very difficult to operate in this type of process.

SUMMARY OF THE INVENTION

This invention relates to a device for separating a mixture that comprises at least one gaseous phase and one liquid phase, whereby said mixture is obtained from a zone for bringing into contact a liquid feedstock, a gaseous feedstock and solid particles, whereby said device is integrated in a chamber and comprises at least:

A piece of equipment such as a recycling cup that is equipped with at least one passage for said mixture, whereby said passage can comprise, for example, a chimney that preferably comprises inserts that generate a centrifugal movement within said chimney or chimneys, A first separating element or primary separator that is placed immediately after said chimney or chimneys allowing a separation of said mixture into a fraction A that contains a majority of liquid and a minority of gas and an essentially gaseous fraction B that contains a minority of liquid, A first pipe that is placed close to the upper portion of said chamber that allows the evacuation of essentially gaseous fraction B that is obtained from the primary separator, A second pipe that extends from the recycling cup and via which fraction A, containing the majority of the liquid that is obtained from said primary separator, flows under the action of gravity and is evacuated, whereby said device is characterized in that it also comprises control means (130) for controlling the expansion level of said liquid phase in said chamber, whereby said means are configured so as to keep said level at a distance from the outlet orifice of fraction B greater than or equal to 0.05 times the inside diameter of said chamber, preferably greater than 0.1 times said diameter. Said distance will be technically the smallest possible according to the invention and generally between 0.05 and 20 times said diameter.

In general, said recycling cup has a conical shape and is placed approximately in the center of said chamber.

Most often, said second evacuation pipe is connected to recycling means in the chamber of at least a portion of fraction A.

Advantageously, the installation also comprises a second separation element or inertial-type secondary separator that allows the separation of said fraction B into a gaseous fraction that is evacuated via the first pipe and a liquid fraction that is evacuated via the second pipe.

According to a first embodiment of the invention, each secondary separator is connected via a pipe to a primary separator, whereby the number of primary separators is equal to the number of secondary separators.

According to an alternative embodiment, each secondary separator is connected via a pipe to a number of primary separators. For example, the recycling cup comprises n primary separators that are grouped into m groups, each group containing p primary separators, whereby the outlets of each primary separator are connected via a pipe to a secondary separator and whereby the number of secondary separators is equal to m, such that m×p=n.

According to a third embodiment of the invention, the second separator is not physically connected to the primary separator, whereby the outlet orifices of the primary separator and the inlet of said secondary separator are found in a portion of the chamber that contains an essentially gaseous phase.

Advantageously, the installation can comprise a third separation element or inertial-type tertiary separator, connected in the chamber to the inlet orifice of the pipe for evacuation of the gaseous phase outside of the chamber, whereby said tertiary separator treats the gaseous fraction that is obtained from the secondary separator.

In some applications of this invention, said initial mixture also comprises a solid phase, whereby said solid phase is separated by the primary separator and evacuated outside of the chamber with fraction A that contains the majority of the liquid.

In a preferred embodiment, the device comprises separate means for recycling and drawing off fraction A that contains a majority of liquid and a minority of gas.

Advantageously, these separate means comprise concentric pipes, one ensuring recycling and at least one ensuring draw-off.

Two concentric pipes are preferably used. The draw-off is preferably ensured by a second pipe that is concentric to the recycling pipe and that extends from the recycling equipment, whereby said second pipe has an upper orifice that is placed close to the expansion level of the liquid phase and is connected in its lower portion to means for evacuating fraction A and for controlling the liquid phase within the chamber.

This device can be applied particularly in the separation of the effluents that are obtained from a reaction process in a boiling bed. For example, this invention can be applied to the hydroconversion of a hydrocarbon feedstock in the presence of hydrogen and catalyst particles. Thus, in the case of hydroconversion within a boiling bed of solid catalyst particles of a hydrocarbon feedstock whose boiling point is higher than 360° C., the pressure conditions prevailing inside the chamber will typically be between 10 and 20 MPa, the reaction temperature is most often between 350 and 480° C., and the equivalent diameter of the solid particles used advantageously is between 500 microns and 5 mm.

ADVANTAGES OF THE INVENTION

In its most general form, the invention describes a device that makes it possible to improve the separation of liquid fractions (for example in the case of a boiling bed) or solid/liquid fractions (for example in the case of a slurry reactor) of the gaseous fraction, whereby said fractions are obtained from a zone for bringing into contact a liquid phase, a gaseous phase and solid particles.

In the case of a boiling bed, the invention makes it possible both to ensure a minimum entrainment of gas in the recycled liquid that ensures putting solid particles into motion and producing a gas that is virtually free of liquid at the top of the reactor.

With the liquid level control that is present in the chamber and a separation inside the reaction chamber of the various fractions described above, the invention also makes it possible to reduce the cost of installations that are described in the prior art, for example by eliminating outside separation equipment. This invention typically can be advantageously applied within the framework of the modernization of already existing units.

PRESENTATION OF THE FIGURES

Other characteristics, details and advantages of the invention will emerge more clearly from reading the description below, done with FIGS. 1 to 3, of three non-limiting embodiments of the invention.

DETAILED DESCRIPTION

Figure 1:
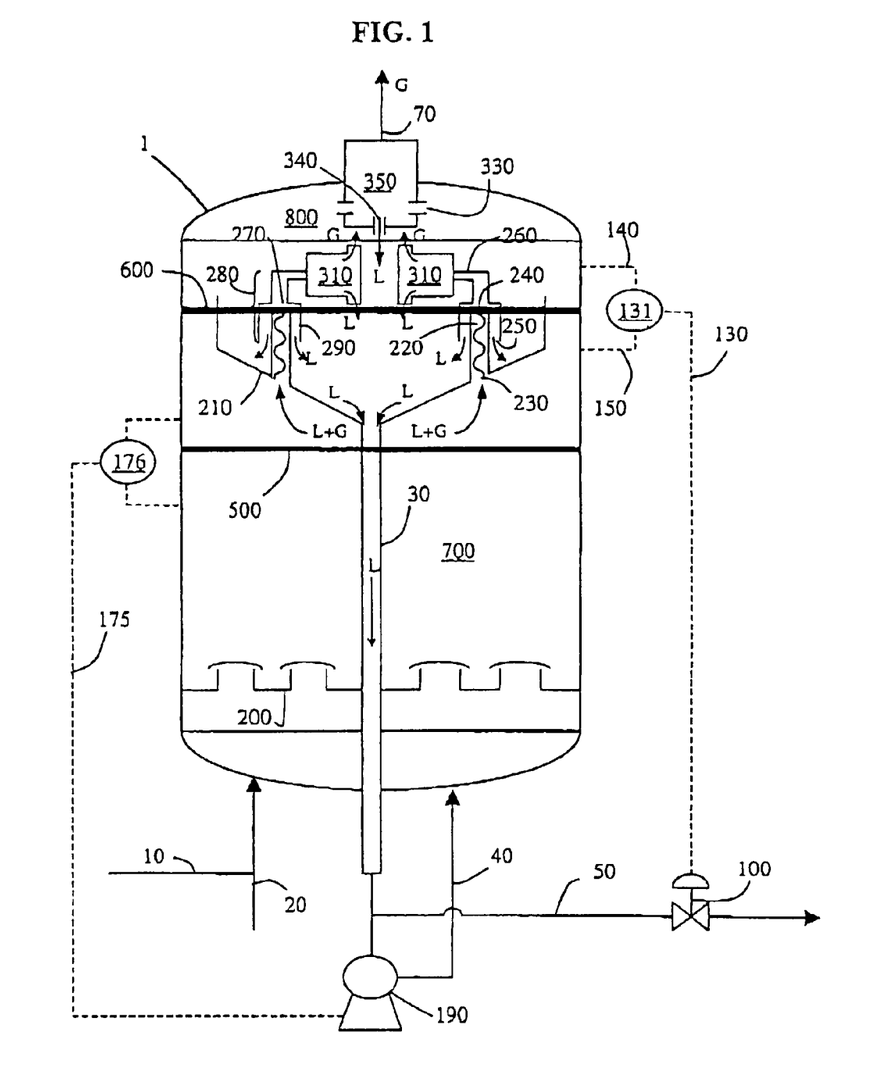
FIG. 1 diagrammatically illustrates a chamber that is equipped with a device for separating gaseous and liquid fractions at the outlet of a boiling bed according to the invention.

FIG. 1 illustrates the particular, but non-limiting case of a reactor 1 for hydroconversion of a heavy hydrocarbon feedstock in the presence of hydrogen ($H_2$) and catalyst particles within a boiling bed 700. Said reactor 1 is fed with liquid feedstock (comprising a mixture of heavy hydrocarbons) via a pipe 10 and with gaseous feedstock (comprising for the most part hydrogen) via a pipe 20, whereby the mixture between the two phases can be carried out upstream from or in the reactor itself. Equipment 200 that is used for the distribution of the liquid and gaseous feedstocks is placed in the lower portion of the reactor. This equipment is, for example, multiaperture plates or plates that are equipped with valves, placed over the entire section of reactor 1 in an approximately horizontal plane. After passage via equipment 200, the liquid and gaseous feedstocks are brought into contact with solid catalyst particles of known size and shape, and they are optimized by one skilled in the art within boiling bed 700. The catalyst particles are kept in suspension by the climbing speed of the liquid phase. Most often, said speed sets the rate of expansion of the catalytic solid particle bed, whereby the gas flow rate is kept constant. Level 500 that consists of a slightly turbulent plane because of the stirring caused by the passage of gas bubbles delimits the zone that is rich in solid catalyst particles. This level, for a given inventory of solid particles, depends only on the flow rates of gas and liquid that traverse the reaction zone. Above level 500, said particles are not entrained significantly. The zone that is located between interface 500 that delimits the bed of said particles and interface 600 consists for the most part of a mixture of a gaseous fraction and a liquid fraction. The gaseous fraction flows in the form of bubbles in the continuous liquid fraction. An essentially gaseous phase that contains only droplets of liquid dispersed in the continuous gaseous phase is located above interface 600.

The catalyst bed is brought to a boil by the recycling of said liquid fraction in the reactor so as to maintain a liquid surface speed that is suitable for preventing the decanting of solid catalyst particles and for allowing a period of contact between the liquid, the gas and said particles under interface 500 that is long enough to satisfy kinetic and thermodynamic constraints of the reaction. For these purposes, the liquid is therefore drawn off from the reactor under interface 600 with a piece of equipment 210 that can be a recycling cup that is most often placed approximately in the center of reactor 1 and that is preferably conical in shape, for example as described in U.S. Pat. No. 4,221,653. The liquid that is obtained from piece of equipment 210 feeds a downward pipe 30 then a pump 190. At the outlet of pump 190, the liquid is transported via a pipe 40 and reinjected into the reactor upstream from distribution means 200.

The feed system of the liquid recycling circuit or drawing-off equipment 210 is equipped with devices that make it possible to promote the gas-liquid separation, to deminish the entrainment of gas with the recycled liquid which is detrimental to the good operation of the pump. To promote the coalescence of the small bubbles and thus the release of the gaseous fraction from the liquid fraction, one or several primary separators 280 that promote a vortex effect in the flow are used according to an advantageous embodiment of the invention. These separators advantageously can surround a pipe 220 in which is placed a coil that induces a centrifugal movement of the fluids that are present within said pipe 220. Lower opening 230 of pipe 220 connects the zone that is located between interfaces 500 and 600 and the inside of equipment 210. Upper opening 240 of pipe 220 is located at or near interface 600 whose position can vary, during the operation of the reactor, around a mean value, for example from a distance that corresponds to 1 to 20 times the diameter of pipe 220, typically about 3 times. Said opening 240 emerges on the inside of a chamber 290 that is generally cylindrical in shape. The liquid that is free of a large portion of the gas drains off toward the bottom outside of pipe 220 and inside chamber 290 and feeds recycling system 210 with an opening 250 that is located in the space between the vertical walls of chamber 290 and pipe 220. The gas, in the form of bubbles, flows toward the upper portion of chamber 290 up to interface 600 that is located close to opening 240 then is evacuated from this chamber via an upper opening 270 that is located above interface 600.

Figure 2:
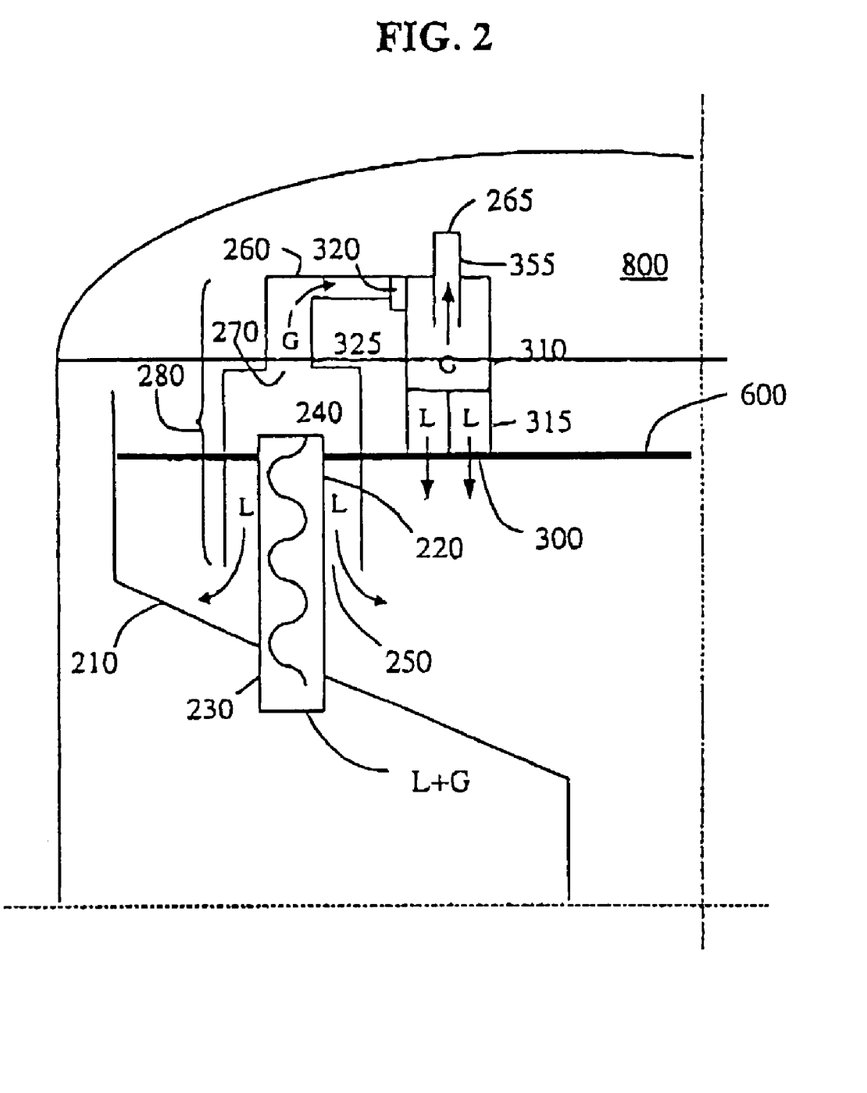
FIG. 2 illustrates a detailed view of an embodiment of said device.

According to the invention, the recycling cup 210 that allows the feed of recycling system (30, 190, 40) as described above is located inside the reactor and advantageously offers an approximately axial symmetry, generally conical, around the axis of the chamber of reactor 1 and covers a passage section that generally represents between 50 and 100% of the passage section of the reactor, and preferably between 80 to 98% of this section. Pump 190 is preferably located outside of the reactor but can also be inside said chamber without exceeding the scope of the invention. The liquid products of the reaction are preferably drawn off upstream from pump 190 via pipe 50 as shown in FIG. 1. Without exceeding the scope of the invention, said draw-off can be carried out, however, downstream from said pump 190. Because of the turbulence that is generated by the release of the liquid fraction bubbles, liquid droplets can be entrained with the gaseous fraction that passes via opening 270. To limit this liquid entrainment with the gaseous effluents, one or more secondary inertial separators 310 can be positioned downstream from pipe 270 of each primary separator 280 according to the invention. The number of separators 310 is preferably less than or equal to the number of separators 280. FIG. 2 shows in more detail the connection between primary separator 280 and secondary separator 310. A pipe 260, preferably bent, connects outlet opening 270 of each separator 280 to the inlet opening of a secondary separator 310. According to the embodiment that is illustrated by FIG. 2, separators 310 are cyclones that consist of a cylindrical chamber that comprises an inlet opening 320, an outlet opening 300 that is located under inlet opening 320 and close to interface 600 for the evacuation of the liquid and an opening 265 for the evacuation of the gas that is essentially cleaned with at least 50% of the liquid that has penetrated via 320, located above inlet 320 and considerably above interface 600.

The gaseous phase that is also loaded with droplets obtained from primary separator 280 via pipe 260 enters tangentially via opening 320 into the cylindrical body of secondary separator 310 and rotates around gas outlet pipe 355 that is located in the center and oriented along the main axis of said body.

The liquid that is obtained from chamber 310 and evacuated via opening 300 reaches interface 600 by mixing with fluids that are located in cupel 210 under interface 600. The gas that exits via opening 265 flows into essentially gaseous dilute phase 800 that is located above interface 600.

According to a first embodiment of the invention, the gas that is obtained from secondary separator 310 then flows to a pipe 70 for evacuating gases (see FIG. 1) via one or more openings that are made in the wall of reactor 1 and are located above interface 600 at a distance that is greater and advantageously close to one-tenth of the diameter of the chamber of reactor 1. The liquid that is extracted from the gas is evacuated using an opening 30 that is located at the base of the cylinder. In the case where opening 300 is located under interface 600, a device 315 will advantageously be used that will make it possible to prevent the formation of a liquid vortex that promotes the entrainment of gas with liquid, whereby said device comprises, for example, crossed blades (not shown in FIG. 1).

According to another embodiment of the invention and as shown in FIG. 1, so as to limit more effectively still the entrainment of liquid in the gaseous effluent that exits from reactor 1, it is advantageous to position close to the outlet of the reactor one or more tertiary inertial separators 350 (FIG. 1) that can be, for example, cyclones of structure and operation that are essentially similar to secondary separators 310 or structured packings. Inlet opening or openings 330 of separator or separators 350 connect the dilute and essentially gaseous phase located above interface 600 to the inside of the chamber of one or more separators 350. Tertiary separators 350 make it possible finally to obtain a gaseous effluent that is essentially cleaned of at least 50% of the liquid that has penetrated via opening 330. The liquid that is separated in chamber 350 and evacuated via opening 340 reaches interface 600 and mixes with fluids that are located under the interface. The gas from which the majority of liquid is removed is evacuated via pipe 70, flows outside of the reactor to undergo optional subsequent treatments. In general, the gas that circulates in pipe 70 contains less than 1% by mass of liquid with the combined use of separating means 280, 310 and 350.

The liquid products that are obtained from pipe 30 and from which essentially the majority of the gas is removed are recycled downstream from the reactor via a recycling line of liquid 40 and under the action of a recycling pump 190. The liquid effluent contains very small amounts of gas (most often less than 1% by mass) with separating equipment 280, 310 and 350 used above recycling cup 210.

To control interface level 500, means for measuring and control can be used to ensure good operation of the reactor. It is possible, for example, to consider measuring interface level 500 precisely by evaluating the density profile in the reactor with a gammameter. The measurement of level that is obtained by this means can feed a regulation loop 175 which, by comparing this value with the set-point entered by the operator via a control device 176, controls the speed of rotation of recycling pump 190. With such a system, a lowering of interface level 500 relative to a given set-point is corrected by an increase of the speed of rotation of pump 190 which induces an increase in the flow rate of liquid that is recycled in recycling circuit (30, 40) and has the effect of increasing the surface speed of liquid in the reactor and later the rate of expansion of the catalyst bed.

To control interface level 600, it is possible to consider, for example, evaluating the density profile in the reactor with a differential pressure sensor that is connected to the reactor by two pressure sensors, one 140 that is located considerably above the desired interface and the other 150 that is located considerably below this same interface. To prevent the clogging of these pressure sensors, it is possible, for example, to blow in known and controlled amounts of gas (for example the initial gaseous feedstock) or of liquid (for example recycled liquid) at the pressure sensors. The measurement of level that is obtained in this way feeds a regulation loop 130 which actuates, for example under the action of a control element 131, the opening of a valve 100 that is located on a pipe 50 for evacuating liquid products from the reactor. Said pipe 50 is preferably placed in a bypass on pipe 30, upstream from pump 190. With such a system, a variation of interface 600 relative to a given set-point will be corrected respectively by a variation of the opening of valve 100, a variation of the flow rate of liquid that is drawn off via line 50 and consequently a variation of the recycled liquid fraction, whereby gas and liquid feed flow rates in lines 10 and 20 remain, for example, constant.

Figure 3:
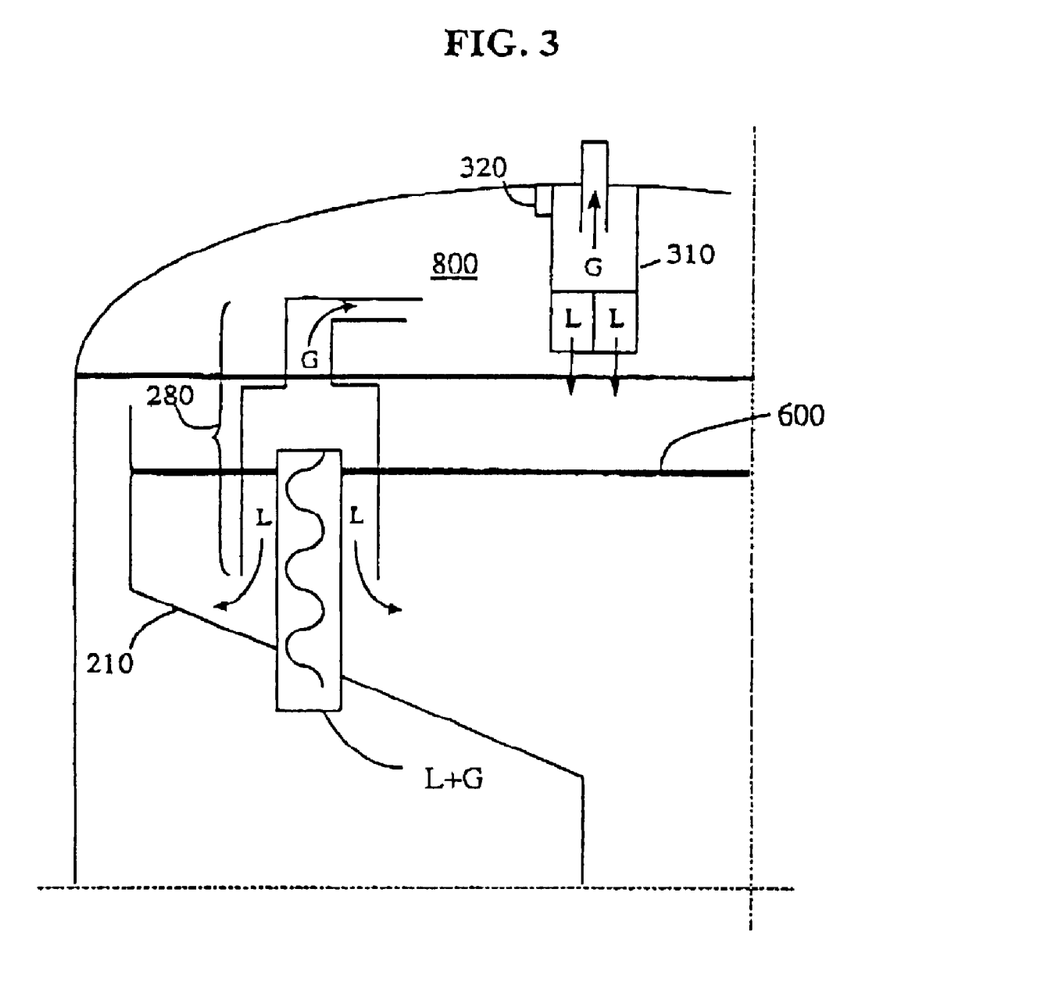
FIG. 3 illustrates another embodiment of said device.

FIG. 3 illustrates another embodiment of the invention that makes possible both the release of gas in the recycling liquid and the separation of the liquid that is entrained in the gas flow. The gas that is loaded with droplets and is obtained from the primary separator enters tangentially via opening 320 of a cyclone 310 of the same type as the one described above in connection with FIG. 2. Primary separators 280 and secondary separators 310 are not connected, whereby the gaseous phase that is still loaded with droplets and obtained from primary separator 280 is evacuated in a first step into the essentially gaseous dilute phase 800 that is located above interface 600.

In the preferred embodiment of the invention that will now be described in connection with FIG. 4, recycling means (30, 190, 40) that are described above in connection with FIG. 1 are dissociated from draw-off means (50, 100) of the liquid phase. Evacuation pipe (30) of FIG. 1 thus comprises (illustrated in FIG. 4) separate means for draw-off and for recycling. For the sake of clarity, the same numbering designates the same elements in the two figures.

Figure 4:
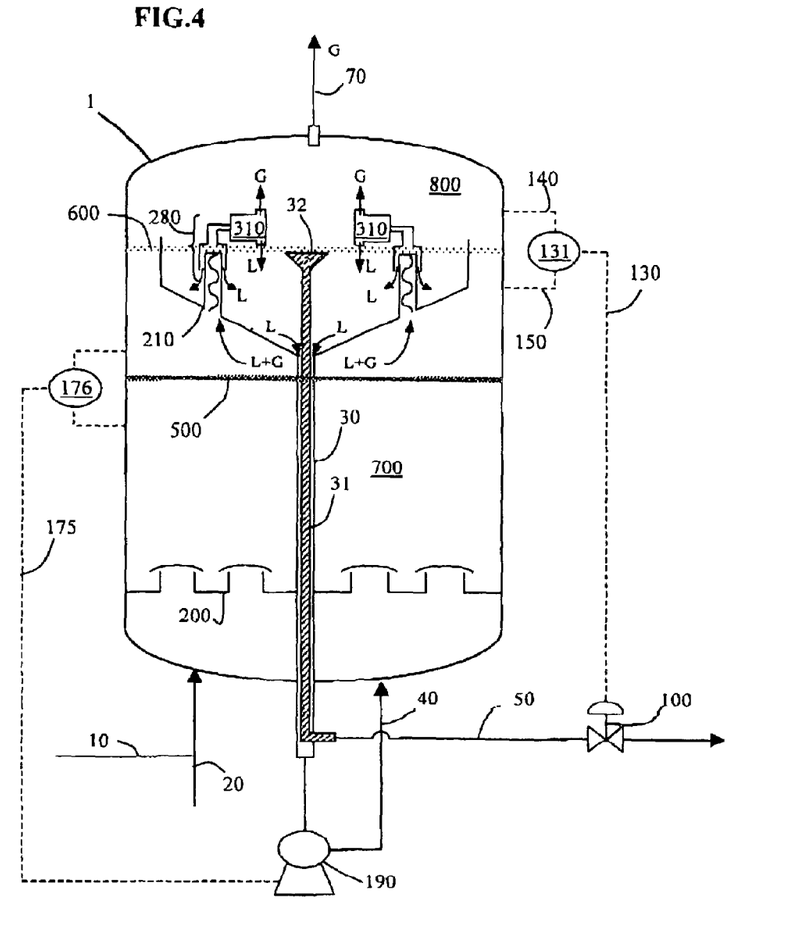
FIG. 4 illustrates a preferred embodiment of the invention.

In the embodiment of FIG. 4, a second pipe 31 is inserted into downward pipe 30, whereby the two pipes are concentric. The two pipes are attached in reactor 1 according to any technique that is known to one skilled in the art. In its upper portion, said pipe 31 preferably has a flared and tapered shape. Said upper portion is placed between pressure sensor zones 140 and 150 such that in operation, its inlet orifice 32 is flush with or at a level that is slightly lower than that of interface 600. The outlet orifices of the liquid phase of separators 280 and 310 are preferably far enough from inlet orifice 32 that allows the input of said flush liquid phase in pipe 31, such that a minimum of gas is entrained with the liquid in said pipe 31.

The respective diameters and lengths of concentric pipes 30 and 31 are separate enough to allow the expansion of inside pipe 31 without complete or partial clogging of outside pipe 30. The scope of the invention would not be exceeded, however, by using other equivalent means that make it possible to solve the problems that are linked to the expansion of pipes because of the temperature of the fluids within the reactor. Another possible solution would be, for example, the use of materials that have different thermal expansion coefficients for the two pipes.

The connection of pipes 50 for draw-off and/or pipes 40 for recycling the liquid fraction can be carried out, for example, outside or inside reactor 1.

During the operation of reactor 1, the liquid and gaseous reactions are separated within various separation stages (280, 310). Only separating elements 280 and 310 have been shown in FIG. 4 but quite obviously do not constitute a limitation of this embodiment. In particular, all of the possible combinations between the various concatenations of separating means 280, 310 and 350, described in connection with FIGS. 1, 2 and 3, as well as the use of a single primary separator could have been represented in the embodiment of FIG. 4, without exceeding the scope of this invention.

At the outlet of said separators, the gaseous fraction is evacuated at the top of the reactor via pipe 70. A portion of the liquid fraction feeds pump 190 and the recycling circuit of the liquid phase via pipe 30. Another portion of said liquid fraction is evacuated via pipe 31, via opening 32, and feeds pipe 50 for draw-off of liquid products from the reactor. Valve 100 makes it possible to control the flow rate of the drawn-off liquid.

The decoupling of draw-off means (31, 50, 100) and recycling means (30, 190, 40) offers the advantage of a better control of various interfaces (500, 600) at the reactor. Thus, by dissociating said means, any boiling loss of the bed during a broad opening of valve 100 and/or problems in maintaining interface 600 between two sensors 150 and 140, for example during significant variations of flow rates of drawn-off liquid or of the flow rate of injected feedstock, are effectively prevented.

An alarm system (not shown) can also be provided in the case where level 600 would come together with pressure sensor zone 140 and/or pressure sensor zone 150.

The entire disclosures of all applications, patents and publications, cited herein and of corresponding France application No. 0109055, filed Jul. 6, 2001, and U.S. Provisional Application Ser. No. 60/361,059, filed Mar. 1, 2002 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:
   at least one piece of recycling equipment (210) equipped with at least one passage for said mixture,
   at least one first separating element (280) or primary separator placed immediately after said passage or passages and that allows a separation of said mixture into a fraction A that contains a majority of liquid and a minority of gas and an essentially gaseous fraction B that contains a minority of liquid,
   at least one pipe (70) placed close to the upper portion of said chamber that allows the evacuation of essentially gaseous fraction B obtained from the primary separator,
   at least one evacuation pipe (30) that extends from recycling equipment (210) and via which fraction A, containing the majority of the liquid obtained from said primary separator, flows under the action of gravity and is evacuated,
   wherein said device further comprises means (130) for controlling the expansion level of said liquid phase in said chamber, wherein said means are configured so as to keep said level at a distance from the outlet orifice (70) of fraction B greater than or equal to 0.05 times the inside diameter of said chamber, and wherein evacuation pipe 30 comprises separate means for recycling (30, 190, 40) and for draw-off (31, 50, 100) of at least a portion of said fraction A, wherein said separate means comprises at least concentric pipes, at least one ensuring the recycling and at least one ensuring the draw-off.

2. A device according to claim 1, wherein said recycling equipment (210) has a conical shape and is placed approximately in the center of said chamber.

3. A device according to claim 1 further comprising at least one second separating element or inertial-type secondary separator (310) that allows the separation of said fraction B into a gaseous fraction that is evacuated via pipe (70) and a liquid fraction that is evacuated via pipe (30).

4. A device according to claim 1, wherein said mixture also comprises a solid phase, whereby said solid phase is separated by the primary separator and evacuated via pipe (30) with fraction A that contains the majority of the liquid.

5. A device according to claim 1, wherein said means are configured so as to keep said level at a distance from the outlet orifice (70) of fraction B greater than or equal to 0.1 times the inside diameter of said chamber.

6. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:
   at least one piece of recycling equipment (210) equipped with at least one passage for said mixture,
   at least one first separating element (280) or primary separator placed immediately after said passage or passages and that allows a separation of said mixture into a fraction A that contains a majority of liquid and a minority of gas and an essentially gaseous fraction B that contains a minority of liquid,
   at least one pipe (70) placed close to the upper portion of said chamber that allows the evacuation of essentially gaseous fraction B obtained from the primary separator,
   at least one evacuation pipe (30) that extends from recycling equipment (210) and via which fraction A, containing the majority of the liquid obtained from said primary separator, flows under the action of gravity and is evacuated,
   wherein said device further comprises means (130) for controlling the expansion level of said liquid phase in said chamber, wherein said means are configured so as to keep said level at a distance from the outlet orifice (70) of fraction B greater than or equal to 0.05 times the inside diameter of said chamber, and wherein evacuation pipe 30 comprises separate means for recycling (30, 190, 40) and for draw-off (31, 50, 100) of at least a portion of said fraction A, wherein said draw-off means comprises a second pipe (31) concentric to pipe (30) and that extends from recycling equipment (210), whereby said second pipe (31) has an upper orifice (32) that is placed near the expansion level of the liquid phase and is connected in its lower portion to means for evacuating (60) fraction A and means for controlling (100, 130) the liquid phase within said chamber.

7. A device according to claim 6, wherein said recycling equipment (210) is a recycling cup that is equipped with at least one chimney (220) that comprises inserts that generate a centrifugal movement within said chimney or chimneys (220).

8. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:

- at least one piece of recycling equipment (210) equipped with at least one passage for said mixture,
- at least one first separating element (280) or primary separator placed immediately after said passage or passages and that allows a separation of said mixture into a fraction A that contains a majority of liquid and a minority of gas and an essentially gaseous fraction B that contains a minority of liquid,
- at least one pipe (70) placed close to the upper portion of said chamber that allows the evacuation of essentially gaseous fraction B obtained from the primary separator,
- at least one evacuation pipe (30) that extends from recycling equipment (210) and via which fraction A, containing the majority of the liquid obtained from said primary separator, flows under the action of gravity and is evacuated,
- wherein said device further comprises means (130) for controlling the expansion level of said liquid phase in said chamber, wherein said means are configured so as to keep said level at a distance from the outlet orifice (70) of fraction B greater than or equal to 0.05 times the inside diameter of said chamber,
- further comprising at least one second separating element or inertial-type secondary separator (310) that allows the separation of said fraction B into a gaseous fraction that is evacuated via pipe (70) and a liquid fraction that is evacuated via pipe (30), wherein each secondary separator (310) is connected via at least one pipe (260) to a primary separator (280), whereby the number of primary separators (280) is equal to the number of secondary separators (310).

9. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:

- at least one piece of recycling equipment (210) equipped with at least one passage for said mixture,
- at least one first separating element (280) or primary separator placed immediately after said passage or passages and that allows a separation of said mixture into a fraction A that contains a majority of liquid and a minority of gas and an essentially gaseous fraction B that contains a minority of liquid,
- at least one pipe (70) placed close to the upper portion of said chamber that allows the evacuation of essentially gaseous fraction B obtained from the primary separator,
- at least one evacuation pipe (30) that extends from recycling equipment (210) and via which fraction A, containing the majority of the liquid obtained from said primary separator, flows under the action of gravity and is evacuated,
- wherein said device further comprises means (130) for controlling the expansion level of said liquid phase in said chamber, wherein said means are configured so as to keep said level at a distance from the outlet orifice (70) of fraction B greater than or equal to 0.05 times the inside diameter of said chamber,
- further comprising at least one second separating element or inertial-type secondary separator (310) that allows the separation of said fraction B into a gaseous fraction that is evacuated via pipe (70) and a liquid fraction that is evacuated via pipe (30) wherein at least one secondary separator (310) is connected via at least one pipe (260) to a number of primary separators (280).

10. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:

- at least one piece of recycling equipment (210) equipped with at least one passage for said mixture,
- at least one first separating element (280) or primary separator placed immediately after said passage or passages and that allows a separation of said mixture into a fraction A that contains a majority of liquid and a minority of gas and an essentially gaseous fraction B that contains a minority of liquid,
- at least one pipe (70) placed close to the upper portion of said chamber that allows the evacuation of essentially gaseous fraction B obtained from the primary separator,
- at least one evacuation pipe (30) that extends from recycling equipment (210) and via which fraction A, containing the majority of the liquid obtained from said primary separator, flows under the action of gravity and is evacuated,
- wherein said device further comprises means (130) for controlling the expansion level of said liquid phase in said chamber, wherein said means are configured so as to keep said level at a distance from the outlet orifice (70) of fraction B greater than or equal to 0.05 times the inside diameter of said chamber,
- further comprising at least one second separating element or inertial-type secondary separator (310) that allows the separation of said fraction B into a gaseous fraction that is evacuated via pipe (70) and a liquid fraction that is evacuated via pipe (30) and
- further comprising at least one third separating element or inertial-type tertiary separator (350), connected in the chamber immediately to the inlet of outlet orifice pipe (70), whereby said tertiary separator treats the gaseous fraction that is obtained from the secondary separator.

11. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:

- at least one piece of recycling equipment (210) equipped with at least one passage for said mixture,
- at least one first separating element (280) or primary separator placed immediately after said passage or passages and that allows a separation of said mixture into a fraction A that contains a majority of liquid and a minority of gas and an essentially gaseous fraction B that contains a minority of liquid, at least one pipe (70) placed close to the upper portion of said chamber that allows the evacuation of essentially gaseous fraction B obtained from the primary separator, at least one evacuation pipe (30) that extends from recycling equipment (210) and via which fraction A, containing the majority of the liquid obtained from said primary separator, flows under the action of gravity and is evacuated, wherein said evacuation pipe 30 comprises separate means for recycling (30, 190, 40) and for draw-off (31, 50, 100) of at least a portion of said fraction A, and wherein said separate means comprises at least 2 concentric pipes, at least one ensuring the recycling and at least one ensuring the draw-off.

12. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:

at least one piece of recycling equipment (210) equipped with at least one passage for said mixture, at least one first separating element (280) or primary separator placed immediately after said passage or passages and that allows a separation of said mixture into a fraction A that contains a majority of liquid and a minority of gas and an essentially gaseous fraction B that contains a minority of liquid, at least one pipe (70) placed close to the upper portion of said chamber that allows the evacuation of essentially gaseous fraction B obtained from the primary separator, at least one evacuation pipe (30) that extends from recycling equipment (210) and via which fraction A, containing the majority of the liquid obtained from said primary separator, flows under the action of gravity and is evacuated, wherein said evacuation pipe (30) comprises separate means for recycling (30, 190, 40) and for draw-off (31, 50, 100) of at least a portion of said fraction A, and wherein said draw-off means comprises a second pipe (31) concentric to pipe (30) and that extends from recycling equipment (210), whereby said second pipe (31) has an upper orifice (32) that is placed near the expansion level of the liquid phase and is connected in its lower portion to means for evacuating (60) fraction A and means for controlling (100, 130) the liquid phase within said chamber.

13. A device according to claim 12, wherein said recycling equipment (210) is a recycling cup that is equipped with at least one chimney (220) that comprises inserts that generate a centrifugal movement within said chimney or chimneys (220).

14. A device for separating a mixture that comprises at least one gaseous phase and a liquid phase, whereby said mixture is obtained from a zone for bringing into contact a liquid feedstock, a gaseous feedstock and solid particles, said device being integrated in a chamber and comprising at least:

at least one piece of recycling equipment (210) equipped with at least one passage for said mixture, at least one first separating element (280) or primary separator placed immediately after said passage or passages and that allows a separation of said mixture into a fraction A that contains a majority of liquid and a minority of gas and an essentially gaseous fraction B that contains a minority of liquid, at least one pipe (70) placed close to the upper portion of said chamber that allows the evacuation of essentially gaseous fraction B obtained from the primary separator, at least one evacuation pipe (30) that extends from recycling equipment (210) and via which fraction A, containing the majority of the liquid obtained from said primary separator, flows under the action of gravity and is evacuated, and further comprising at least one second separating element or inertial-type secondary separator (310) that allows the separation of said fraction B into a gaseous fraction that is evacuated via pipe (70) and a liquid fraction that is evacuated via pipe (30), and wherein at least one second separating element or initial-type secondary separator (310) is connected via at least one pipe (260) to at least one primary separator (280).

15. A device according to claim 14, wherein each secondary separator (310) is connected via at least one pipe (260) to a primary separator (280), whereby the number of primary separators (280) is equal to the number of secondary separators (310).

16. A device according to claim 14, wherein at least one secondary separator (310) is connected via at least one pipe (260) to a number of primary separators (280).

17. A device according to claim 14, wherein said recycling equipment (210) is a recycling cup that is equipped with at least one chimney (220) that comprises inserts that generate a centrifugal movement within said chimney or chimneys (220).

18. A device according to claim 14, wherein at least one secondary separator (310) is connected via at least one pipe (260) to a number of primary separators (280).

19. A device according to claim 18, wherein at least one second separating element or initial-type secondary separator (310) is connected via at least one pipe (260) to at least one primary separator (280).

20. A device according to claim 18, wherein each secondary separator (310) is connected via at least one pipe (260) to a primary separator (280), whereby the number of primary separators (280) is equal to the number of secondary separators (310).

21. A device according to claim 18, wherein said recycling equipment (210) is a recycling cup that is equipped with at least one chimney (220) that comprises inserts that generate a centrifugal movement within said chimney or chimneys (220).

* * * * *

UNITED STATES PATENT AND TRADEMARK OFFICE
CERTIFICATE OF CORRECTION

| | | |
|---|---|---|
| PATENT NO. | : 7,060,228 B2 | Page 1 of 1 |
| APPLICATION NO. | : 10/189774 | |
| DATED | : June 13, 2006 | |
| INVENTOR(S) | : Brunard et al. | |

It is certified that error appears in the above-identified patent and that said Letters Patent is hereby corrected as shown below:

Column 14, line 36 reads "claim 14" should read -- claim 12 --

Signed and Sealed this

Twenty-third Day of January, 2007

JON W. DUDAS
*Director of the United States Patent and Trademark Office*